(12) United States Patent
Wang et al.

(10) Patent No.: US 8,059,224 B2
(45) Date of Patent: Nov. 15, 2011

(54) REPAIR METHOD OF A PIXEL STRUCTURE INCLUDING A GATE HAVING A NOTCH

(75) Inventors: Ming-Tsung Wang, Keelung (TW); Ming-Hsuan Chang, Taoyuan County (TW); Zhi-Zhong Liu, Changhua County (TW); Meng-Chieh Tai, Yilan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/703,748

(22) Filed: Feb. 10, 2010

(65) Prior Publication Data
US 2010/0141861 A1    Jun. 10, 2010

Related U.S. Application Data

(62) Division of application No. 11/308,553, filed on Apr. 6, 2006, now Pat. No. 7,688,392.

(51) Int. Cl.
*G02F 1/1333* (2006.01)
*G02F 1/1343* (2006.01)
*G02F 1/136* (2006.01)
*G02F 1/13* (2006.01)

(52) U.S. Cl. ............... 349/55; 349/46; 349/54; 349/192

(58) Field of Classification Search ............... 349/46, 349/54–55, 192
See application file for complete search history.

(56) References Cited

U.S. PATENT DOCUMENTS
5,877,512 A     3/1999 Kim
2004/0227893 A1* 11/2004 Nam et al. ............... 349/145

FOREIGN PATENT DOCUMENTS
TW        200605008        2/2006
* cited by examiner

*Primary Examiner* — Mark Robinson
*Assistant Examiner* — Charles Chang
(74) *Attorney, Agent, or Firm* — Jianq Chyun IP Office

(57) ABSTRACT

A pixel structure is provided. The pixel structure includes a scan line, a gate, a first dielectric layer, a channel layer, a source, a drain, a data line, a second dielectric layer, and a pixel electrode. The gate is electrically connected to the scan line and has a first notch. The first dielectric layer covers the scan line and the gate. The channel layer is disposed on the first dielectric layer over the gate and exposed by the first notch. The source and the drain are disposed on the channel layer. Part of the drain is located over the first notch. The data line is disposed on the first dielectric layer and electrically connected to the source. The second dielectric layer covers the source, the drain and the data line. The pixel electrode is disposed on the second dielectric layer and electrically connected to the drain.

7 Claims, 10 Drawing Sheets of pixel structure includes the following. A pixel structure is provided, wherein the pixel structure includes a scan line, a gate, a first dielectric layer, a channel layer, a source, a drain, a data line, a second dielectric layer, and a pixel electrode. Wherein, the gate is electrically connected to the scan line and has a first notch. The first dielectric layer covers the scan line and the gate. The channel layer is disposed on the first dielectric layer over the gate and exposed by the first notch. The source and the drain are disposed on the channel layer. Part of the drain is located over the first notch. The data line is disposed on the first dielectric layer and electrically connected to the source. The second dielectric layer covers the source, the drain and the data line. The pixel electrode is disposed on the second dielectric layer and electrically connected to the drain. Then, a part of the drain located over the first notch is cut off, such that the part of the drain located over the first notch is electrically disconnected with other part of the drain.

REPAIR METHOD OF A PIXEL STRUCTURE INCLUDING A GATE HAVING A NOTCH

CROSS-REFERENCE TO RELATED APPLICATION

This application is a divisional application of and claims priority benefit of U.S. application Ser. No. 11/308,553, filed on Apr. 6, 2006, now allowed. The entirety of the above-mentioned patent application is hereby incorporated by reference herein and made a part of this specification.

BACKGROUND OF THE INVENTION

1. Field of Invention

The invention relates to a pixel structure and repair method thereof. More particularly, the invention relates to a pixel structure and repair method thereof, which can improve the display quality of the liquid crystal display panel.

2. Description of Related Art

Nowadays, the development of multimedia technology can be mostly attributed to the improvement of the semiconductor devices or the display devices. For the display devices, the thin film transistor liquid crystal displays (TFT-LCD), with advantages such as high image quality, high spatial utilization, low power consumption, and low radiation, etc., have gradually become the main stream product in the market.

The typical TFT-LCD mainly includes a thin film transistor array substrate, an opposite substrate, and a liquid crystal layer disposed between the two substrates. Wherein, the thin film transistor array substrate mainly includes a substrate, thin film transistors arranged on the substrate in an array, pixel electrodes, scan lines, and data lines. In general, the scan line and the data line can transmit a signal into the corresponding pixel structure.

FIG. 1A is a partial schematic view of a conventional pixel structure, and FIG. 1B is a cross-sectional schematic view of FIG. 1A along line A-A'. Please refer to FIG. 1A and FIG. 1B simultaneously. The conventional pixel structure 120 is made on a substrate 110. The pixel structure 120 mainly includes a thin film transistor 122, a pixel electrode 124, a scan line 126 and a data line 128. Wherein, the thin film transistor 122 is electrically connected to the pixel electrode 124, and the thin film transistor 122 has a bottom gate. As shown in FIG. 1B, the thin film transistor 122, disposed on the substrate 110, mainly includes a gate 122a, a channel layer 122b, a source 122c, and a drain 122d, wherein the drain 122d of the thin film transistor 122 is electrically connected to the pixel electrode 124 through a contact hole H. As shown in FIG. 1A, a suitable voltage can be transmitted to the thin film transistor 122 by the scan line 126 and the data line 128, and the voltage is transmitted to the pixel electrode 124 through the thin film transistor 122.

Note that, as the gate 122a and the drain 122d are partially overlapped, a parasitic capacitance $C_{gd}$ may be generated between the gate 122a and the drain 122d. In FIG. 1A, the reference number 10 marks the overlapping area between the drain 122d and the gate 122a. In addition, the capacitor value of the parasitic capacitance $C_{gd}$ has positive relation to the area of the overlapping area 10. The parasitic capacitance $C_{gd}$ may cause RC delay; accordingly, the feed-through voltage of the charged pixel electrode 124 can not reach the predefined voltage. That is, the feed-through voltage of the charged pixel electrode 124 may vary according to the capacitor value of the parasitic capacitance $C_{gd}$.

In the fabrication of the pixel structure 120, the overlapping area of each gate 122a and drain 122d should be equal. However, in the fabrication of the thin film transistor array substrate, there would be the so-called overlay shift in the photolithograph process of each photomask due to the alignment error of the photomask or the tremble of the machine, etc., and the overlay shift may be more serious in the fabrication of a large panel. In addition, when the overlay shift between the gate 122a and the drain 122d in partial areas is too large, the difference between the capacitor value of the parasitic capacitor $C_{gd}$ in the area and the capacitor value of the parasitic capacitor $C_{gd}$ in other area is too much, resulting in the mura of feed-through voltage in each area. Accordingly, the feed-through voltage of the charged pixel electrode 124 does not reach the predefined voltage, so that the display mura may occur in the liquid crystal display panel using the pixel structure 120.

In addition, in the fabrication process of the thin film transistor array substrate, a part of the pixel structure 120 may inevitably have defects and can not work normally. The defects may cause bright spots or bright lines in the liquid crystal display panel when displaying images.

SUMMARY OF THE INVENTION

Accordingly, the invention is directed to provide a pixel structure which can improve the display quality of the liquid crystal display panel.

According to another aspect of the invention, a repair method of pixel structure is provided to repair the pixel structure having defects.

According to another aspect of the invention, another pixel structure which can improve the display quality of the liquid crystal display panel is provided.

According to another aspect of the invention, a repair method of pixel structure is provided to repair the above-mentioned another pixel structure to avoid the bright spots on the liquid crystal display panel.

According to another aspect of the invention, a repair method of pixel structure to repair the above-mentioned another pixel structure is provided to avoid the bright lines on the liquid crystal display panel.

The invention provides a pixel structure, including a scan line, a gate, a first dielectric layer, a channel layer, a source, a drain, a data line, a second dielectric layer, and a pixel electrode. Wherein, the gate is electrically connected to the scan line and has a first notch. The first dielectric layer covers the scan line and the gate. The channel layer is disposed on the first dielectric layer over the gate and exposed by the first notch. The source and the drain are disposed on the channel layer. Part of the drain is located over the first notch. The data line is disposed on the first dielectric layer and electrically connected to the source. The second dielectric layer covers the source, the drain and the data line. The pixel electrode is disposed on the second dielectric layer and electrically connected to the drain.

According to one embodiment of the invention, the channel layer may have a second notch above the first notch and the first notch is exposed by the second notch.

According to one embodiment of the invention, the pixel structure further includes a common line, suitable to be electrically connected to a common voltage, wherein a part of the common line is disposed under the pixel electrode and the other part of the common line is disposed under the data line.

According to one embodiment of the invention, the pixel structure may further include an ohmic contact layer disposed between the channel layer, the source and the drain.

The invention provides a repair method of pixel structure, suitable to repair the above pixel structure. The repair method of pixel structure includes the following steps: first, the drain between the first notch and the pixel electrode is cut, so that the pixel structure is electrically insulated from the source; next, the common line is connected to the data line; next, the common line is connected to the pixel electrode; then, the common line is cut, so that the data line and the pixel electrode are electrically insulated from the common voltage.

According to one embodiment of the invention, the method of cutting the drain may include laser cutting process.

According to one embodiment of the invention, the method of connecting the common line and the data line may include laser fusion process.

According to one embodiment of the invention, the method of connecting the common line and the pixel electrode may include laser fusion process.

According to one embodiment of the invention, the method of cutting the common line may include laser cutting process.

The invention further provides a pixel structure. The pixel structure includes a scan line, a gate, a first dielectric layer, a channel layer, a source, a drain, a data line, a second dielectric layer, and a pixel electrode. Wherein, the gate is electrically connected to the scan line and has a first opening. The first dielectric layer covers the scan line and the gate. The channel layer is disposed on the first dielectric layer over the gate and exposed by the first opening. The source and the drain are disposed on the channel layer, wherein part of the drain is located over the first opening. The data line is disposed on the first dielectric layer and electrically connected to the source. The second dielectric layer covers the source, the drain and the data line. The pixel electrode is disposed on the second dielectric layer and electrically connected to the drain.

According to one embodiment of the invention, the pixel structure may further include a common line, suitable to be electrically connected to a common voltage; a part of the common line is disposed under the pixel electrode and the other part of the common line is disposed under the data line.

According to one embodiment of the invention, the source may have a third notch above the first opening, and one end of the drain is disposed in the third notch.

According to one embodiment of the invention, the pixel structure may further include an extension line electrically connected between the data line and the source, and, the extend line, the data line, and the source form a third opening. In addition, part of the scan line is disposed in the third opening.

According to one embodiment of the invention, the channel layer may have a second opening above the first opening and the first opening is exposed by the second opening.

According to one embodiment of the invention, the pixel structure may further include an ohmic contact layer disposed between the channel layer, the source and the drain.

The invention further provides a repair method of pixel structure, suitable to repair the above-mentioned pixel structure. The repair method of pixel structure includes the following steps: first, the drain between the gate and the pixel electrode is cut, so that the pixel electrode is electrically insulated from the gate and the source; next, the common line is connected to the data line; next, the common line is connected to the pixel electrode; then, the common line is cut, so that the data line and the pixel electrode are electrically insulated from the common voltage.

According to one embodiment of the invention, the method of cutting the drain may include laser cutting process.

According to one embodiment of the invention, the method of connecting the common line and the data line may include laser fusion process.

According to one embodiment of the invention, the method of connecting the common line and the pixel electrode may include laser fusion process.

According to one embodiment of the invention, the method of cutting the common line may include laser cutting process.

The invention further provides a repair method of pixel structure, suitable to repair the above-mentioned another pixel structure. The repair method of pixel structure includes the following steps: the data line is cut on the two sides of the scan line, so that the data line is conducted with the source through the extension line. Wherein, the method of cutting the data line on the two sides of the scan line may include laser cutting process.

In summary, in the pixel structure of the invention, as the gate has notches or openings, and a part of drain is disposed in the notch or opening of the gate, the overlapping area between the drain and the gate may remain the same when there is alignment error of the photomask to cause the overlay shift. That is, when there is overlay shift, the parasitic capacitance between the drain and the gate disposed under the drain still remain the same capacitor value. When the pixel structure is made into a liquid crystal display panel, the display mura of the liquid crystal display panel can be avoided and good display quality can be obtained. In addition, the repair method of pixel structure can also repair the pixel structure with defects to avoid the bright spots or bright lines on the liquid crystal display panel.

In order to the make the aforementioned and other features and advantages of the invention comprehensible, an embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

Figure 1A:
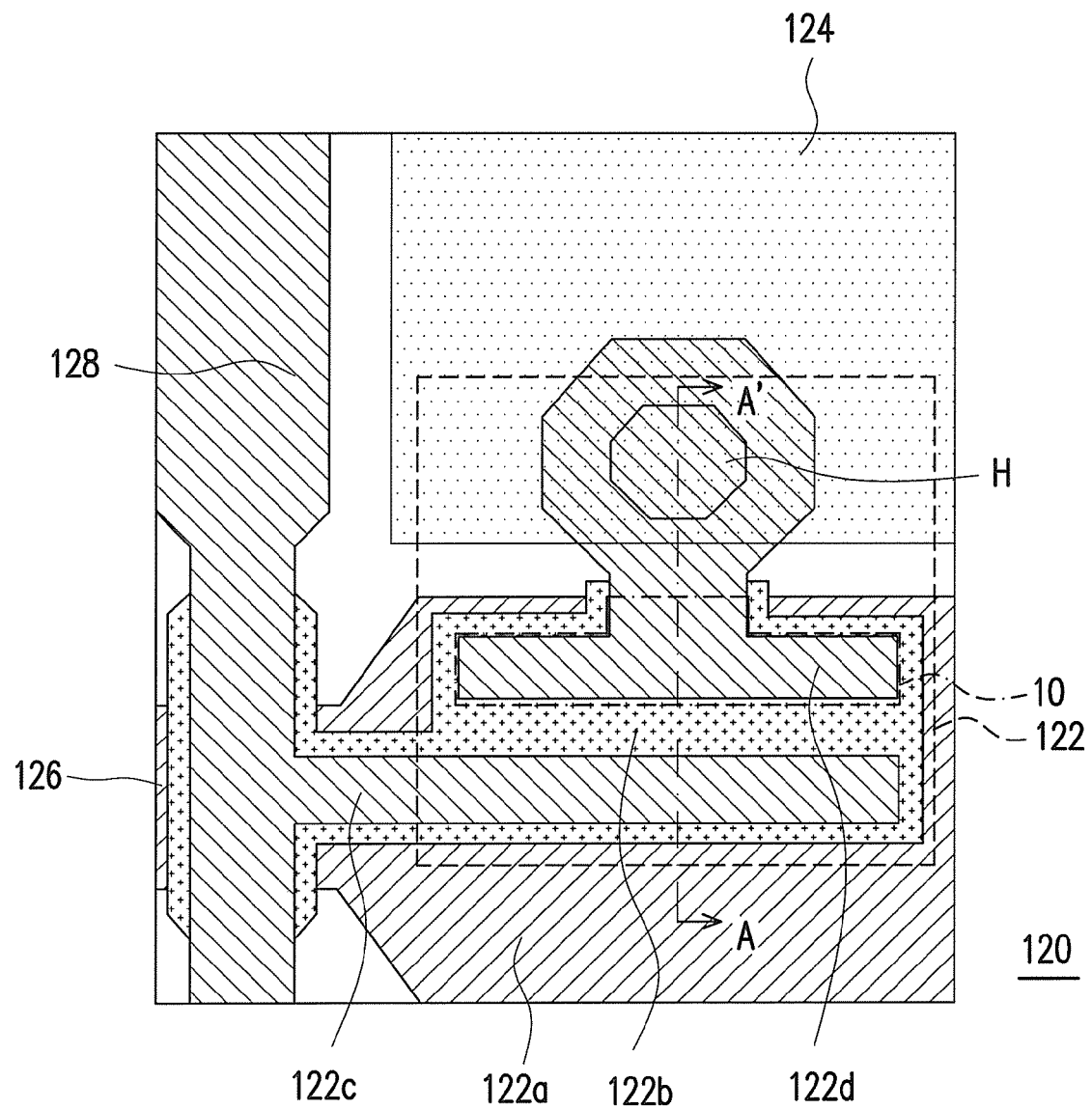
FIG. 1A is a partial schematic diagram of a conventional pixel structure.
Figure 1B:
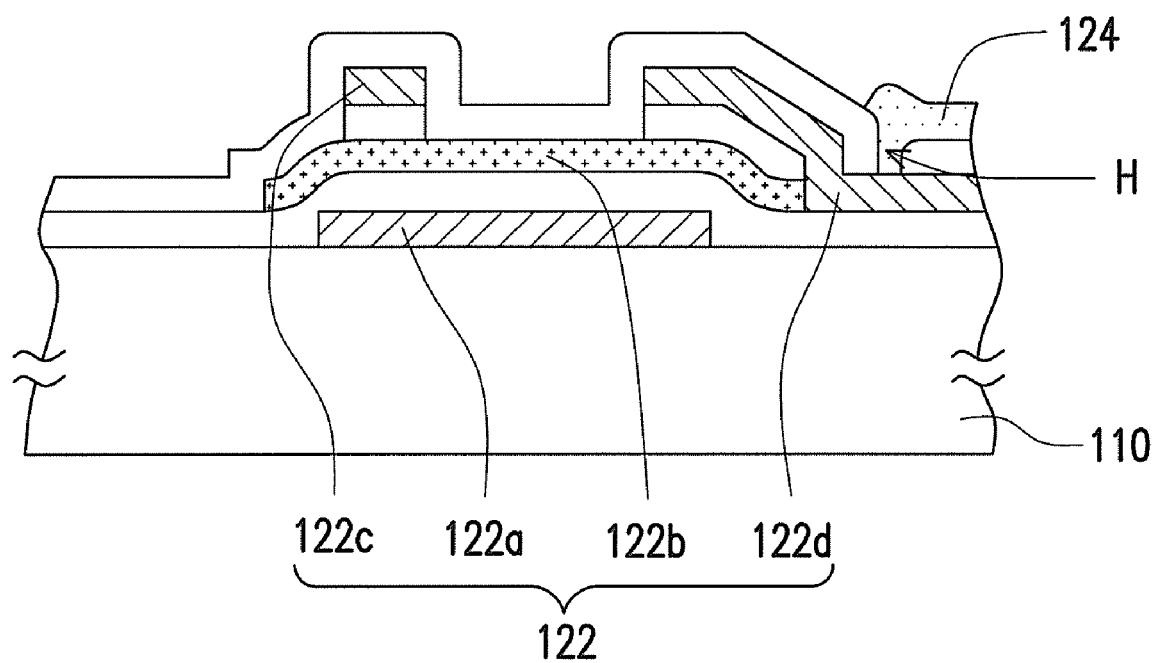
FIG. 1B is a cross-sectional schematic diagram of FIG. 1A along line A-A'.
Figure 2A:
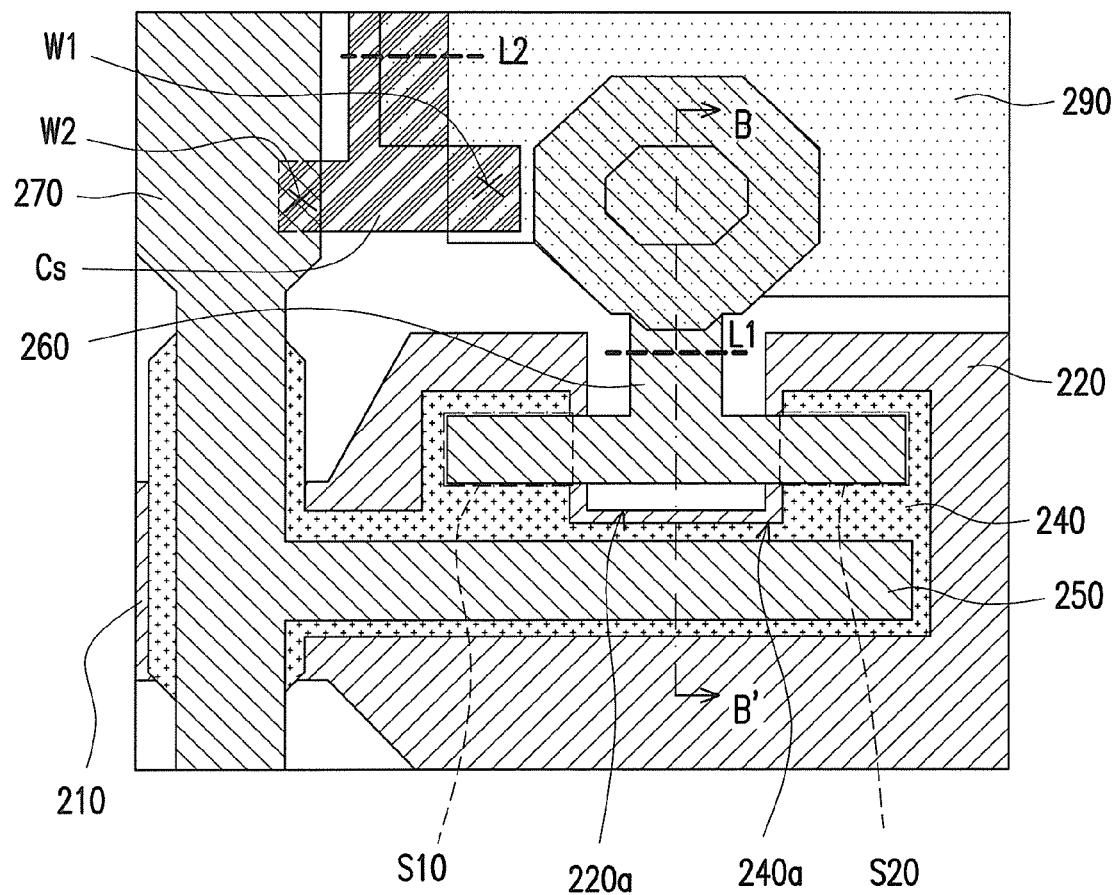
FIG. 2A is a partial enlarged diagram of the pixel structure according to the first embodiment of the invention.

FIG. 2A is a partial enlarged diagram of the pixel structure according to the first embodiment of the invention, and FIG.

Figure 2B:
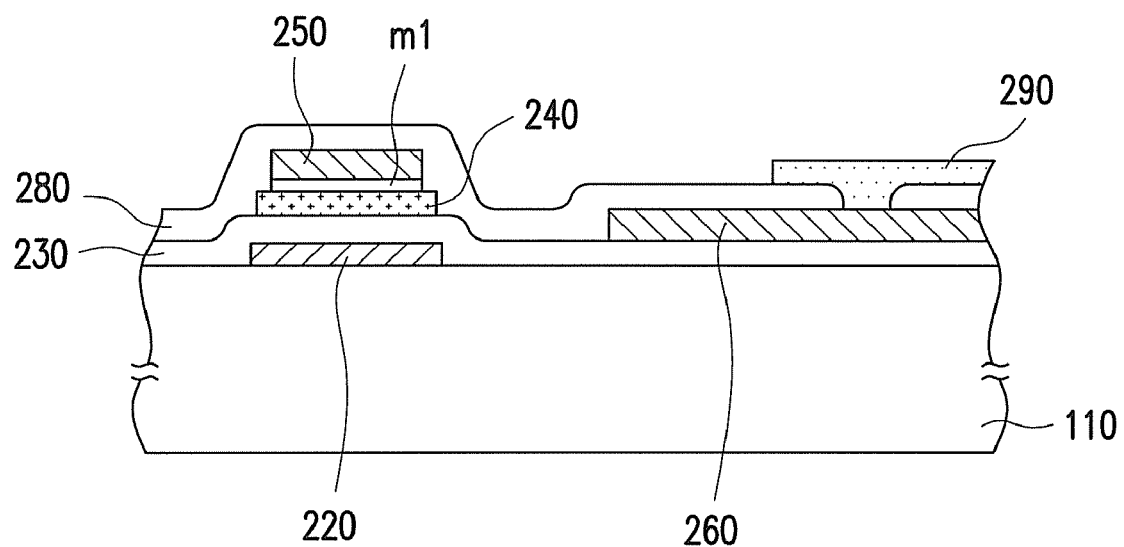
FIG. 2B is a cross-sectional schematic diagram of FIG. 2A along line B-B'.

2B is a cross-sectional schematic diagram of FIG. 2A along line B-B'. Referring to FIG. 2A and FIG. 2B simultaneously, the pixel structure 200 of the embodiment is made on a substrate 110. The substrate 110 can be a glass substrate, a quartz substrate, or other substrates of suitable materials. The pixel structure 200 includes a scan line 210, a gate 220, a first dielectric layer 230, a channel layer 240, a source 250, a drain 260, a data line 270, a second dielectric layer 280, and a pixel electrode 290. The relation of the locations of the elements will be described in the following.

The gate 220 is electrically connected to the scan line 210 and has a first notch 220a. The first dielectric layer 230 covers the scan line 210 and the gate 220. The channel layer 240 is disposed on the first dielectric layer 230 over the gate 220 and exposed by the first notch 220a. The source 250 and the drain 260 are disposed on the channel layer 240. Part of the drain 260 is located over the first notch 220a. The data line 270 is disposed on the first dielectric layer 230 and electrically connected to the source 250. The second dielectric layer 280 covers the source 250, the drain 260 and the data line 270. The pixel electrode 290 is disposed on the second dielectric layer 280 and electrically connected to the drain 260.

As mentioned above, the scan line 210 of the pixel structure 200 can be an aluminum alloy conductive wire or other wire made of suitable conductive materials. The gate 220 can be a chrome electrode, an aluminum alloy electrode or an electrode made of other suitable conductive materials. The material of the first dielectric layer 230 can be silicon nitride, nitride-oxide-silicon or other suitable materials. The channel layer 240 can be amorphous silicon, poly silicon, or a film layer made of other suitable materials. The source 250 and the drain 260 can be aluminum alloy electrodes or electrodes made of other suitable conductive materials. The data line 270 can be a aluminum alloy conductive wire or other wire made of suitable conductive materials. The material of the second dielectric layer 280 can be silicon nitride, nitride-oxide-silicon or other suitable materials. The pixel electrode 290 can be a transmissive electrode, a reflective electrode or a transflective electrode, and the material of the pixel electrode 290 may be indium tin oxide (ITO), indium zinc oxide (IZO), metal or other conductive materials.

In the embodiment, the channel layer 240 of the pixel structure 200 has a second notch 240a above the first notch 220a and the first notch 220a is exposed by the second notch 240a. In the embodiment, the pixel structure 200 may include an ohmic contact layer m1, and the ohmic contact layer m1 can be an N-type doped amorphous silicon or a film layer made of other suitable materials. The ohmic contact layer m1 is disposed between the channel layer 240, the source 250 and the drain 260. In addition, the pixel structure 200 may further include a common line Cs, and a common voltage (not shown) is applied to the common line Cs, and the common line Cs can be an aluminum alloy conductive wire or other conductive layer made of suitable materials. A part of the common line Cs is disposed under the pixel electrode 290 and the other part of the common line Cs is disposed under the data line 270.

As shown in FIG. 2A, the drain 260 is partially overlapped with the gate 220, and the overlapping area is marked by the reference number S10 and S20. As the drain 260 and the gate 220 are partially overlapped, a parasitic capacitance $C_{gd}$ may be generated between the drain 260 and the gate 220. In addition, the capacitor value of the parasitic capacitance $C_{gd}$ has positive relation to the sum of the areas of the overlapping areas S10 and S20. As a part of the drain 260 is disposed in the first notch 220a of the gate 220, in the fabricating process of the pixel structure 200, there is some alignment error or tremble of the machine in the fabricating process of the pixel structure 200, which may result in slight overlay shift between the drain 260 and the gate 220. However, the sum of the overlapping areas S10 and S20 can still remain the same. That is, the parasitic capacitance $C_{gd}$ between the drain 260 and the gate 220 disposed under the drain 260 can still keep the same capacitor value. Accordingly, the RC delay in each area is similar, so that the feed-through voltages of the charged pixel electrode 290 are almost equal to each other. When the thin film transistor array substrate is further made into a liquid crystal display panel, the display mura will be improved. In other words, the liquid crystal display panel with the pixel structure 200 will have good display quality.

In the fabricating process of the pixel structure 200, if the pixel structure 200 has some defects and can not work normally, there would be bright spots on the liquid crystal display panel having the pixel structure 200. At this time, the pixel structure 200 with defects can be repaired.

Continue to refer to FIG. 2A, the repair method of the pixel structure 200 includes the following steps. First, the drain 260 disposed between the first notch 220a and the pixel electrode 290 is cut (that is, the drain 260 is cut along the cut line L1); accordingly, the pixel electrode 290 is electrically insulated from the gate 220 and the source 250. Next, the common line Cs is connected to the data line 270 and the pixel electrode 290 at the fusion points W1 and W2, respectively. Then, the common line Cs is cut (that is, the common line Cs is cut along the cutting line L2), so that the common voltage will not affect the data line 270 and the pixel electrode 290.

Note that, in the repair method of the pixel structure 200, the method of cutting the drain 260 and the common line Cs includes laser cutting process or other suitable methods, and the method of connecting the common line Cs and the data line 270 and connecting the common line Cs and the pixel electrode 290 includes laser fusion process or other suitable methods.

The Second Embodiment

Figure 3A:
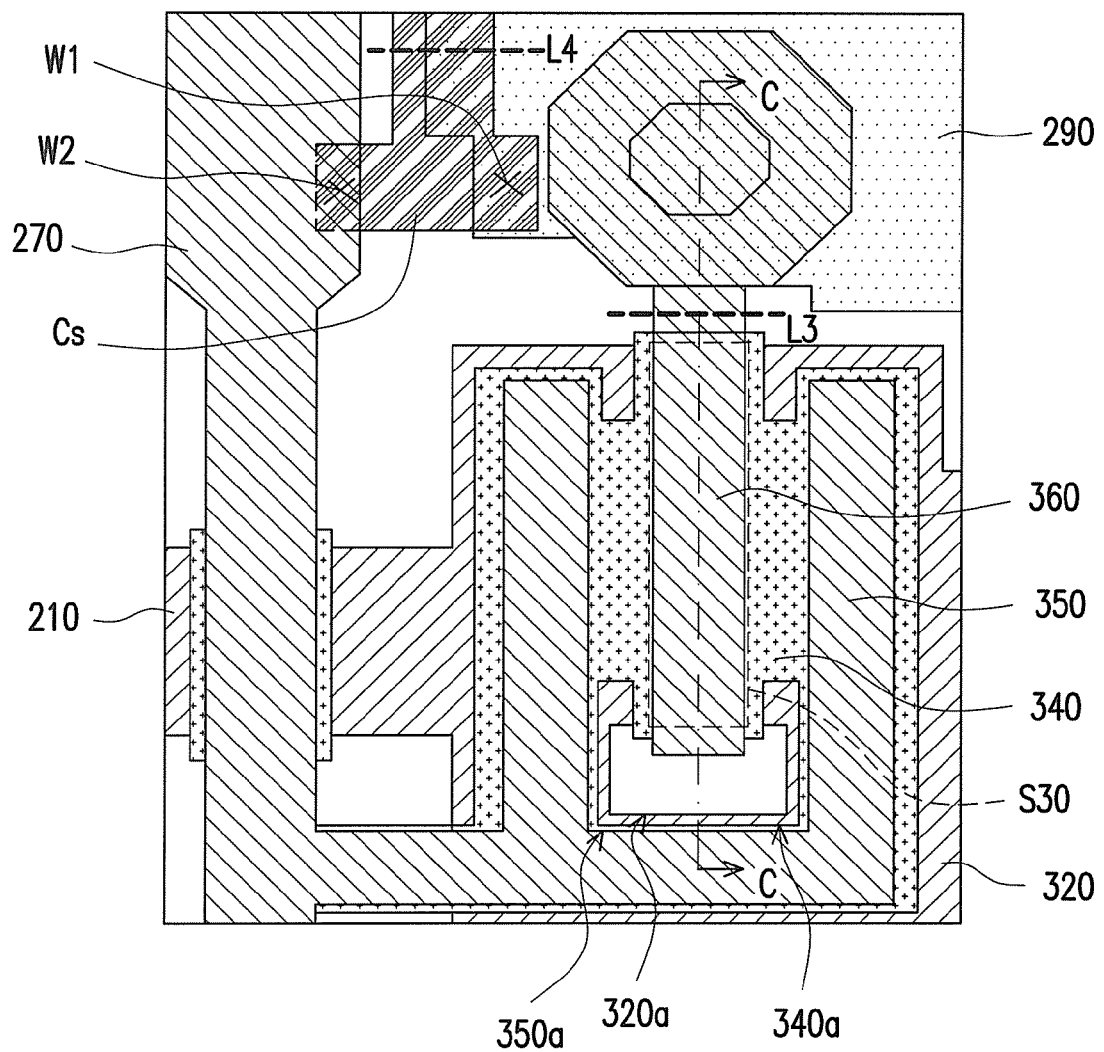
FIG. 3A is a partial enlarged diagram of the pixel structure according to the second embodiment of the invention.
Figure 3B:
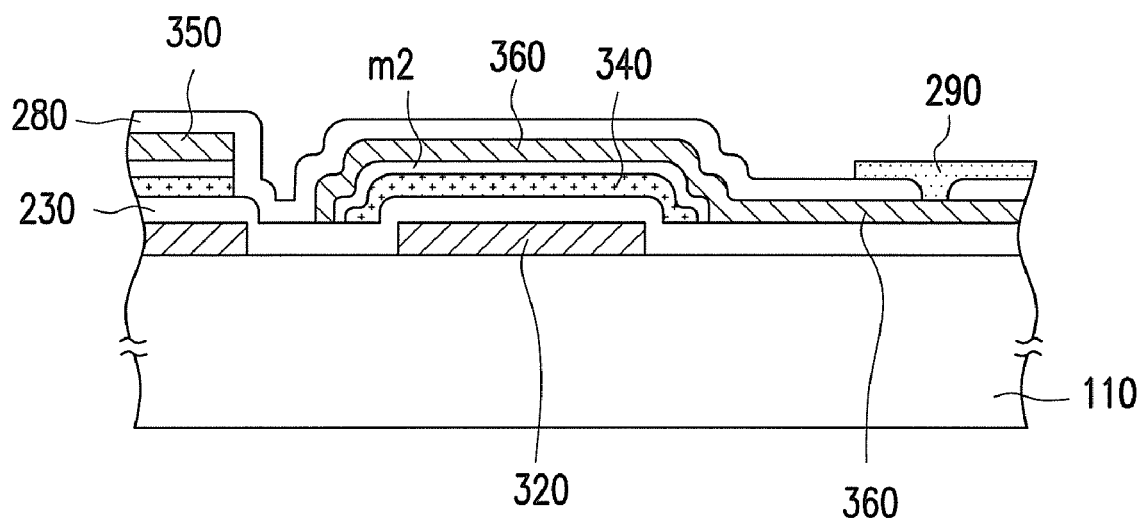
FIG. 3B is a cross-sectional schematic diagram of FIG. 3A along line C-C'.

FIG. 3A is a partial enlarged diagram of the pixel structure according to the second embodiment of the invention, and FIG. 3B is a cross-sectional schematic diagram of FIG. 3A along line C-C'. Referring to FIG. 3A and FIG. 3B simultaneously, the pixel structure 300 of the invention includes a scan line 210, a gate 320, a first dielectric layer 230, a channel layer 340, a source 350, a drain 360, a data line 270, a second dielectric layer 280, and a pixel electrode 290. Wherein, the scan line 210, the first dielectric layer 230, the data line 270, the second dielectric layer 280 and the pixel electrode 290 are the same as those described in the first embodiment. The gate 320 is electrically connected to the scan line 210 and has a first opening 320a. The channel layer 340 is disposed on the first dielectric layer 230 over the gate 320 and exposed by the first opening 320a. The source 350 and the drain 360 are disposed on the channel layer 340. Part of the drain 360 is located over the first opening 320a.

In the embodiment, the source 350 has a third notch 350a disposed over the first opening 320a, and one end of the drain 360 is disposed in the third notch 350a. The channel layer 240 has a second opening 340a disposed over the first opening 320a and the first opening 320a is exposed by the second opening 340a. In more details, the third notch 350a is disposed above the second opening 340a. In addition, the pixel structure 300 further includes an ohmic contact layer m2, and the ohmic contact layer m2 is, for example, an N-type doped amorphous silicon or a film layer made of other suitable materials. The ohmic contact layer m2 is disposed between the channel layer 340, the source 350 and the drain 360.

Note that the pixel structure 300 may also include a common line Cs, and a common voltage is applied to the common line Cs. A part of the common line Cs is disposed under the pixel electrode 290 and the other part of the common line Cs is disposed under the data line 270.

Similar to the first embodiment, as the drain 360 and the gate 320 are partially overlapped, a parasitic capacitance $C_{gd}$ may be formed between the drain 360 and the gate 320. In the fabricating process of the pixel structure 300, if there is overlay shift between the drain 360 and the gate 220, as a part of the drain 360 is disposed in the first opening 320a of the gate 320, the overlay area S30 can still remain the same. As the capacitor value of the parasitic capacitance $C_{gd}$ has positive relation to the area of the overlay area S30, the parasitic capacitance $C_{gd}$ between the drain 360 and the gate 320 can still remain the same under the condition that there is overlay shift between the drain 360 and the gate 220. When the thin film transistor array substrate having the pixel structure 300 is further made into a liquid crystal display panel, the display mura can be improved substantially. In other words, the liquid crystal display panel made of the pixel structure 300 also has good display quality.

The repair method of the pixel structure 300 is similar to the repair method of the pixel structure 200. Continue to refer to FIG. 3A, the repair method of the pixel structure 300 includes the following steps. First, the drain 360 between the gate 320 and the pixel electrode 290 is cut (that is, the drain 360 is cut along the cut line L3); accordingly, the pixel electrode 290 is electrically insulated from the gate 320 and the source 350. Next, the common line Cs is connected to the data line 270 and the pixel electrode 290 at the fusion points W3 and W4, respectively. Then, the common line Cs is cut (that is, the common line Cs is cut along the cutting line L4), so that, the common voltage (not shown) will not be applied to the data line 270 and the pixel electrode 290. In other words, the common voltage will not affect the data line 270 and the pixel electrode 290.

Similar to the repair method of the pixel structure 200, in the repair method of the pixel structure 300, the method of cutting the drain 360 and the common line Cs includes laser cutting process or other suitable methods, and the method of connecting the common line Cs and the data line 270 and connecting the common line Cs and the pixel electrode 290 includes laser fusion process or other suitable methods.

The Third Embodiment

Figure 4A:
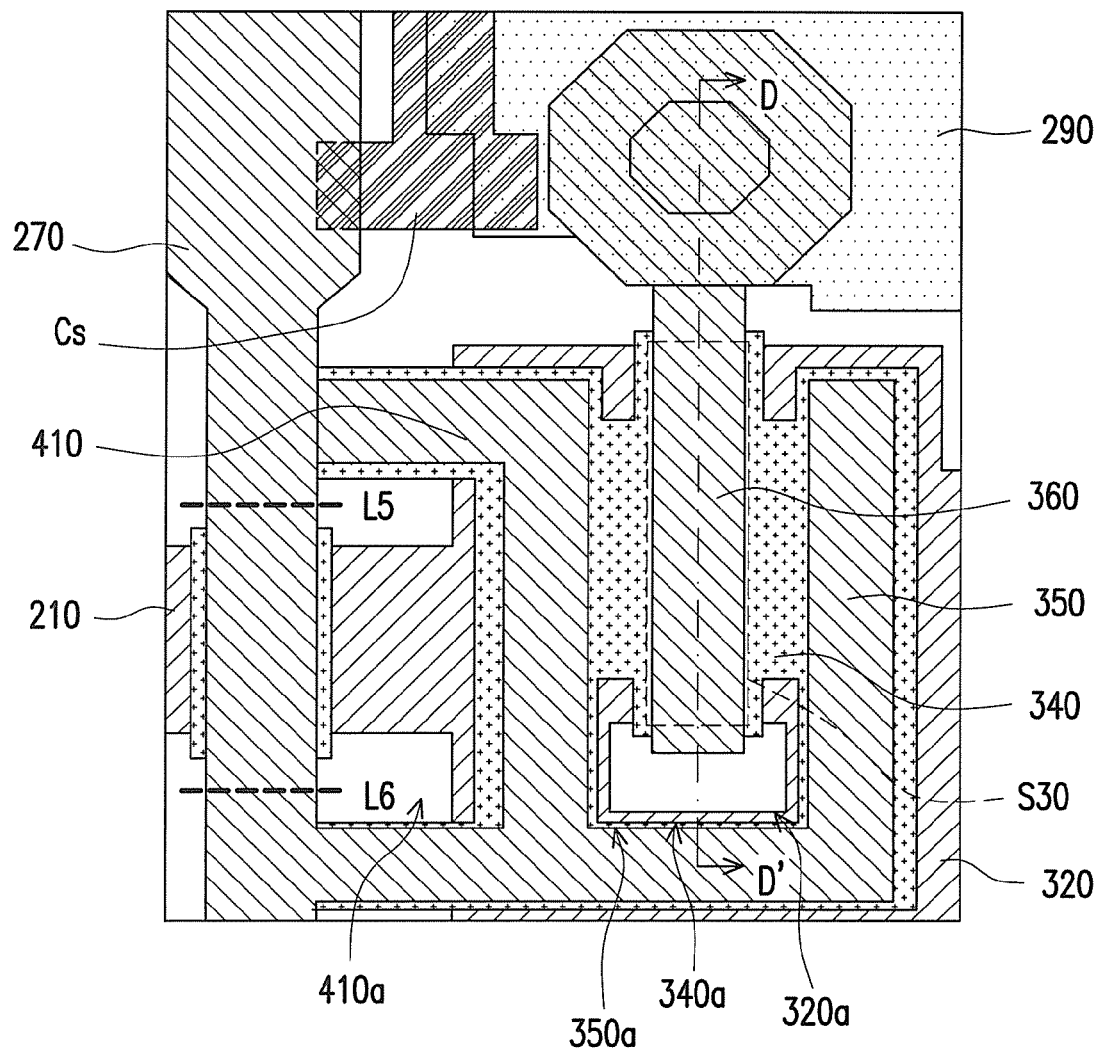
FIG. 4A is a partial enlarged diagram of the pixel structure according to the third embodiment of the invention.
Figure 4B:
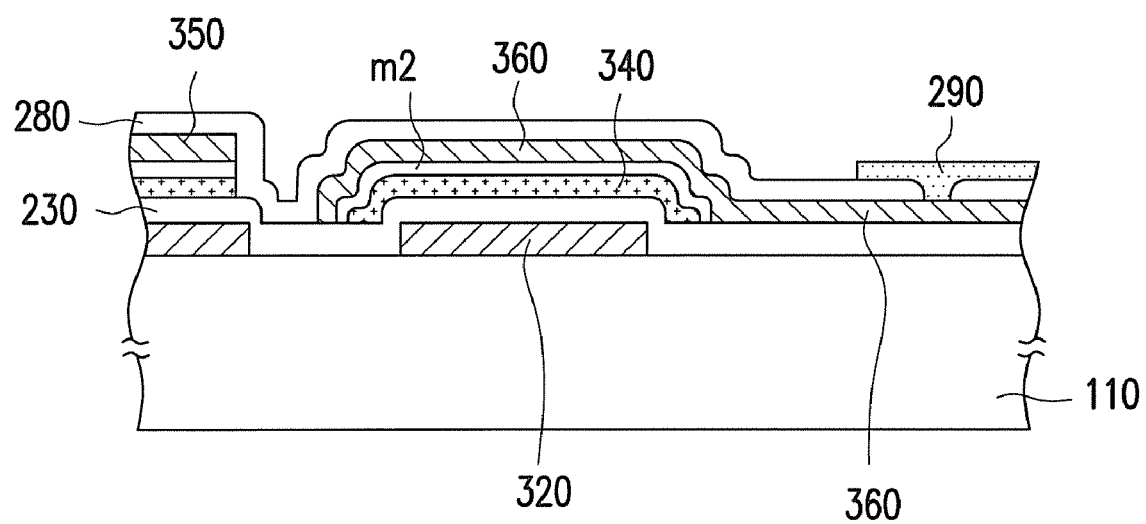
FIG. 4B is a cross-sectional schematic diagram of FIG. 4A along line D-D'.

FIG. 4A is a partial enlarged diagram of the pixel structure according to the third embodiment of the invention, and FIG. 4B is a cross-sectional schematic diagram of FIG. 4A along line D-D'. Referring to FIG. 4A and FIG. 4B simultaneously, the pixel structure 400 of the invention is a transmutation of the pixel structure 300. The difference is that the pixel structure 400 may further include an extension line 410, and the extension line 410 is electrically connected between the data line 270 and the source 350. The material of the extension line 410 can be the same as the material of the data line 270 and the source 350. The extension line 410, the data line 270 and the source 350 form a third opening 410a. In addition, part of the scan line 210 is disposed in the third opening 410a.

The advantage of the pixel structure 400 of the embodiment and the repair method thereof are the same as those described in the second embodiment. The details are not repeated here. However, for the pixel structure 400, the invention further provides another repair method, to repair the break line above the scan line 210 of the data line 270 and the short circuit between the data line 270 and the scan line 210. The repair method will be described in the following.

In general, the data line 270 may be broken when spanning over the location above of the scan line 210 due to the steep gradient. The broken data line 270 is called an open source line caused on the taper of the gate line. In addition, in the fabricating process of the pixel structure 400, some foreign materials may fall into the data line 270 and the scan line 210 and result in short circuit. When the open source line caused on the taper of the gate line or the short circuit between the data line 270 and the scan line occurs, the data line 270 can be cut at the two sides of the scan line 210 (that is, the data line 270 is cut along the cutting line L5, L6), so that the data line 270 can be conducted through the extension line 410 and the source 350. In addition, the method of cutting the data line 270 at the two sides of the scan line 210 may include laser cutting process or other suitable methods.

The Fourth Embodiment

Figure 5A:
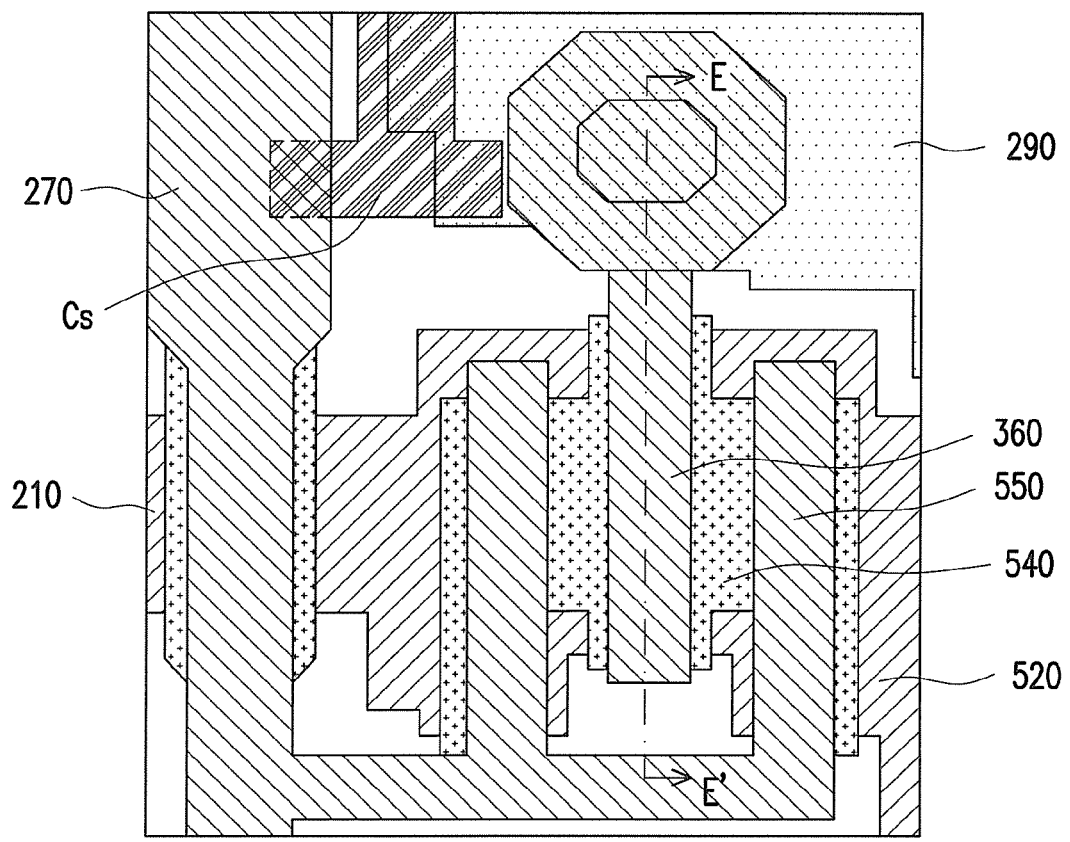
FIG. 5A is a partial enlarged diagram of the pixel structure according to the fourth embodiment of the invention.
Figure 5B:
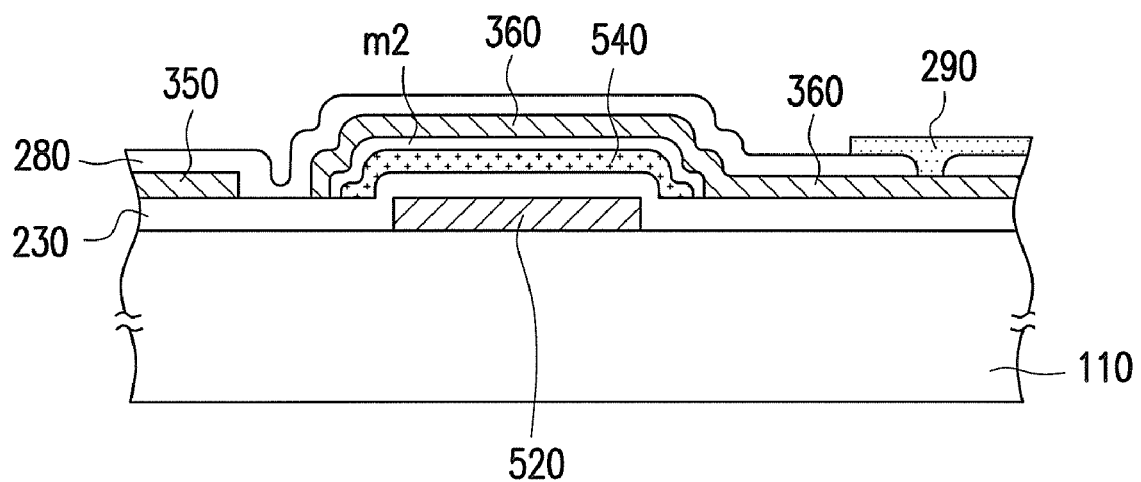
FIG. 5B is a cross-sectional schematic diagram of FIG. 5A along line E-E'.

FIG. 5A is a partial enlarged diagram of the pixel structure according to the fourth embodiment of the invention, and FIG. 5B is a cross-sectional schematic diagram of FIG. 5A along line E-E'. Referring to FIG. 5A and FIG. 5B simultaneously, the pixel structure 500 of the embodiment is a transmutation of the pixel structure 300. The difference is that part of the source 550 does not cover the gate 510. Such design can reduce the parasitic capacitance $C_{sd}$ between the source 550 and the gate 510 and the signal distortion when the pixel structure 500 is driven.

The advantages of the pixel structure 500 of the embodiment and the repair method thereof are the same as those described in the second embodiment, so that the details are not repeated here.

In summary, the pixel structure and the repair method thereof of the invention has at least the following advantages.

First, as a part of the drain is disposed in the first notch or the opening, in the fabricating process of the pixel structure, although some alignment error or slight tremble of the machine may result in overlay shift between the drain and the gate, the sum of the overlapping areas between the drain and the gate can still remain the same. That is, the parasitic capacitance $C_{gd}$ between the drain and the gate disposed under the drain can still keep the same capacitor value. Accordingly, the RC delay in each area is similar, so that the feed-through voltages of the charged pixel electrode are almost equal to each other.

Second, the repair method of pixel structure of the invention can repair the pixel structure with defects to avoid forming the bright spots or bright lines on the liquid crystal display panel. Accordingly, the zero-glare ratio of the liquid crystal display panel can be improved, and the fabricating cost of the liquid crystal display panel can be further reduced.

Third, the fabrication of the pixel structure and the repair method thereof are compatible to the current fabrication process. Therefore, no additional fabrication equipment is needed except for modifications of the design of the photomasks.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A repair method of pixel structure, suitable to repair the pixel structure, the pixel structure including: a scan line; a gate electrically connected to the scan line and having a first notch; a first dielectric layer covering the scan line and the gate; a channel layer disposed on the first dielectric layer over the gate and exposed by the first notch; a source and a drain disposed on the channel layer and part of the drain is disposed over the first notch; a data line disposed on the first dielectric layer and electrically connected to the source; a second dielectric layer covering the source, the drain and the data line; a pixel electrode disposed on the second dielectric layer and electrically connected to the drain; and a common line suitable to be electrically connected to a common voltage and a part of the common line is disposed under the pixel electrode and the other art of the common line is disposed under the data line, wherein the repair method of pixel structure comprises:

cutting the drain between the first notch and the pixel electrode, so that the pixel electrode is electrically insulated from the gate and the source;

connecting the common line to the data line;

connecting the common line to the pixel electrode; and cutting the common line, so that the data line and the pixel electrode are electrically insulated from the common voltage.

2. The repair method as claimed in claim 1, wherein the channel layer of the pixel structure has a second notch disposed above the first notch and the first notch is exposed by the second notch.

3. The repair method as claimed in claim 1, wherein the pixel structure further includes an ohmic contact layer, disposed between the channel layer, the source and the drain.

4. The repair method as claimed in claim 1, wherein the method of cutting the drain includes a laser cutting process.

5. The repair method as claimed in claim 1, wherein the method of connecting the common line and the data line includes a laser fusion process.

6. The repair method as claimed in claim 1, wherein the method of connecting the common line and the pixel electrode includes a laser fusion process.

7. The repair method as claimed in claim 1, wherein the method of cutting the common line includes a laser cutting process.

* * * * *